United States Patent [19]
Sakamoto et al.

[11] Patent Number: 4,807,925
[45] Date of Patent: Feb. 28, 1989

[54] FRONT VEHICLE BODY STRUCTURE

[75] Inventors: Toshinori Sakamoto; Osamu Matsuura, both of Hiroshima, Japan

[73] Assignee: Mazda Motor Corporation, Hiroshima, Japan

[21] Appl. No.: 13,568

[22] Filed: Feb. 11, 1987

[30] Foreign Application Priority Data

Feb. 13, 1986 [JP] Japan .................... 61-30430

[51] Int. Cl.4 ............................................ B62D 25/00
[52] U.S. Cl. ..................... 296/194; 296/203; 296/205; 296/188
[58] Field of Search ............. 296/187, 188, 193, 194, 296/200–203, 205, 210, 84 D, 84 R

[56] References Cited

U.S. PATENT DOCUMENTS

| 1,523,636 | 1/1925 | Dunn | 296/203 |
| 1,534,814 | 4/1925 | Seelinger | 296/201 |
| 1,545,727 | 7/1925 | Barndt | 296/200 |
| 2,269,451 | 1/1942 | Ford | 296/205 |
| 2,389,907 | 11/1945 | Helmuth | 296/203 |
| 2,620,221 | 12/1952 | Romano | 296/200 X |
| 2,719,749 | 10/1955 | Richards et al. | 296/200 |

FOREIGN PATENT DOCUMENTS 5720359  7/1980  Japan .

OTHER PUBLICATIONS

*1987 Ford Trucks*, product brochure, Aerostar Wagon/-Van, pp. 8 and 9, Aug. 1986.

Primary Examiner—Dennis H. Pedder
Attorney, Agent, or Firm—Wegner & Bretschneider

[57] ABSTRACT

The front pillar as a vehicle body rigidity member is constructed with a first front pillar arranged on the front side of the vehicle body and a second front pillar arranged on the rear side thereof. This construction enables the front pillar to meet with requirements contrary to each other, that is, for an improvement in a rigidity, particularly a flexural rigidity and for widening the front field of vision.

6 Claims, 2 Drawing Sheets

FRONT VEHICLE BODY STRUCTURE

BACKGROUND OF THE INVENTION

1. Field of the Invention

The present invention relates to a front vehicle body structure and, more particularly, to an improvement in a front pillar as a vehicle body rigidity member.

2. Description of the Prior Art

A vehicle contains an passenger's chamber having a desired driving space formed generally connecting a front fender portion positioned on both sides of the front vehicle body and both sides of the roof to the respective left and right front pillars. The passenger's chamber requires high rigidity for the purpose of protecting the passenger from being injured by protecting the space in case of car crashes or the like. Accordingly, the front pillars are a vehicle body rigidity member constituting a basic frame structure of a vehicle, and various attempts have been made to increase a rigidity for attachments of the front pillars, for example, by connecting the lower end portion of the front pillar to a hinge pillar having a closed section, as disclosed in Japanese Utility Model Application (Early Publication) No. 20,359/1982.

It is also noted that front pillars, as one of the vehicle body rigidity members, require in themselves rigidity, in particular flexural rigidity in the front-and-rear direction of the vehicle body. At the same time, it must meet with a requirement for making the vehicle body lightweight. Thus, front pillars are generally designed to be of a hollow closed cross section. In order to increase the rigidity of such front pillars, an enlargement of the cross sectional area has been attempted, but this causes the problem that the front field of vision becomes narrower as the cross sectional area of the front pillars gets larger.

Front pillars have now been designed so as to determine sizes by balancing the two functions contrary to each other, that is, sufficient rigidity required as a vehicle body rigidity member and an adequately wide field of vision.

SUMMARY OF THE INVENTION

The present invention has an object to provide a front vehicle body structure of an automobile adapted to increase rigidity of a front pillar as a vehicle body rigidity member and ensure a sufficiently wide field of vision.

The present invention has another object to provide a front vehicle body structure of an automobile adapted to improve a performance of the front pillars to absorb crash energies arising from a car crash.

The present invention further has another object to provide a front vehicle body structure of an automobile, which is superior in rigidity over prior structures as compared to the weight of the front pillars.

In order to achieve the above objects, the present invention is constructed primarily by constituting a front pillar with a first front pillar arranged in the front direction of the vehicle body and a second front pillar arranged behind the first front pillar in the front-and-rear direction thereof. By constructing the front pillar with two pieces of front pillars, the total rigidity required as a vehicle body rigidity member can easily be ensured even if each of the first and second front pillars is rendered slimmer and the front field of vision can be enlarged. In addition, the first and second front pillars are supported by each other so as to compensate for the other. If they would have a total cross sectional area as much as a cross sectional area of a conventional front pillar, it is advantageous in terms of improvement in rigidity, particularly flexural rigidity, of the first and second front pillars. Furthermore, the load on the vehicle body resulting from a car crash is disperse so that absorption of crash energies can be improved.

As preferred embodiments according to the present invention, it is preferable that the first and second front pillars are designed to be of a hollow closed cross section. This construction enables the vehicle body to be lightweight and increases its flexural rigidity. A whole shape of the front pillar is preferably constructed so as to make the first front pillar to be of a nearly straight shape, as with conventional ones, and the second front pillar to be arranged behind the first front pillar in the rear direction in a manner such that the upper portion is of a nearly straight shape and the lower portion is curved largely in the front direction. This construction has the advantage that the distance between the first and second front pillars can be set in an arbitrary manner. With this arrangement, it is a matter of course that the lower end of the first front pillar is usually connected to a hinge pillar, i.e., another vehicle body rigidity member, mounted at the rear end portion of a front fender portion and the second front pillar is connected at its lower end to a vehicle body rigidity member in the front fender portion such as the hinge pillar or an apron reinforcement. From the actual point of view, the second front pillar is connected to the hinge pillar at a position lower than that where the first front pillar is connected.

In order to secure the action to be exerted by a combination of the first front pillar with the second one, it is preferred that the second front pillar is connected to the first front pillar with a connecting member bridging therebetween and extending in the front-and-rear direction of the vehicle body. In this case, appearance will not be impaired if the connecting member is mounted at a position at which it is covered with an exterior plate member. It is preferable to form the connecting member in a hollow section in order to make the vehicle body lightweight.

DETAILED DESCRIPTION OF THE PREFERRED EMBODIMENTS

The present invention will be described more in detail with reference to FIGS. 1 and 2.

Figure 1:
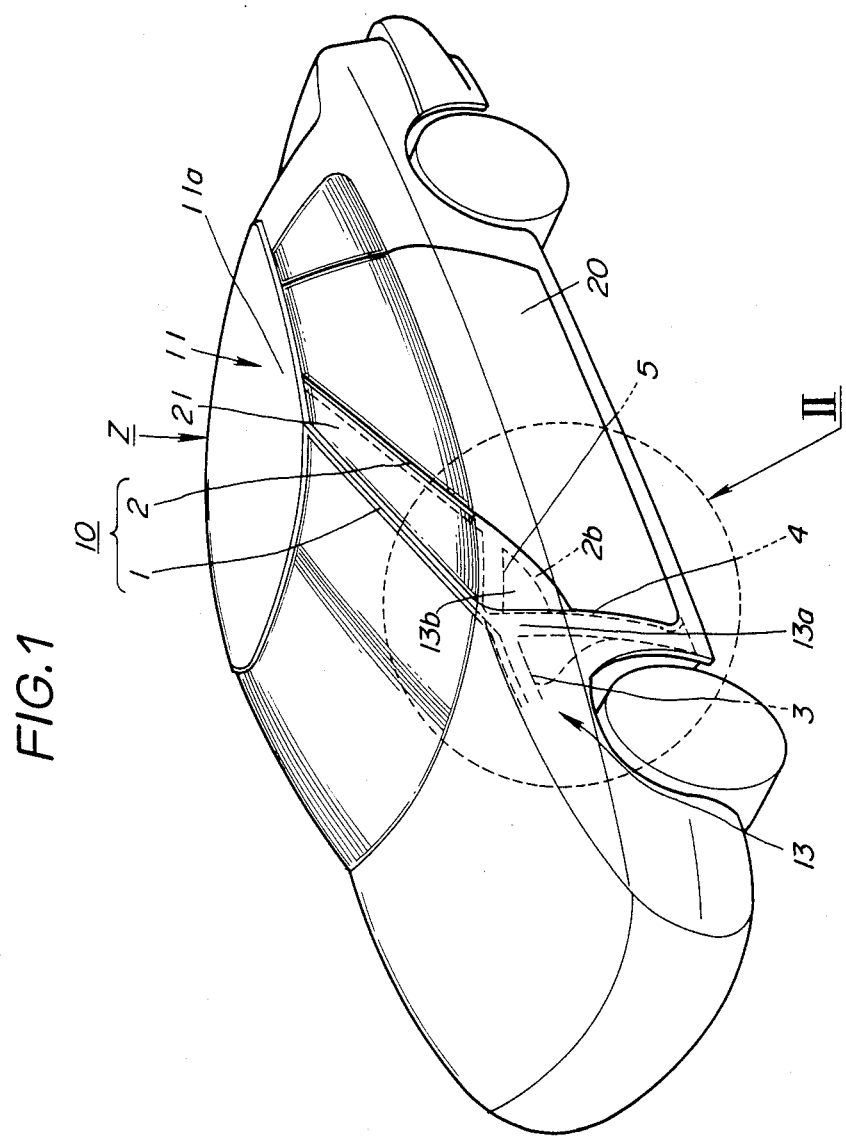
FIG. 1 is a perspective view of a vehicle having a front vehicle body structure according to the present invention.

FIG. 1 shows a vehicle Z having a front vehicle body structure according to an embodiment of the present invention. In FIG. 1, reference numeral 10 denotes a front pillar that is directed to the subject matter of the present invention, and the front pillar 10 is disposed between the front end portion 11a of the side portion of roof panel 11 and the rear end portion 13a of a front fender panel 13. Within the front fender panel 13 are disposed an apron reinforcement 3 and a hinge pillar 4. The apron reinforcement 3 has a closed section of an appropriate size and is mounted in the front-and-rear direction of the vehicle body with one end 3a on the backward side thereof connected to the upper end portion 4a of the hinge pillar 4.

Figure 2:
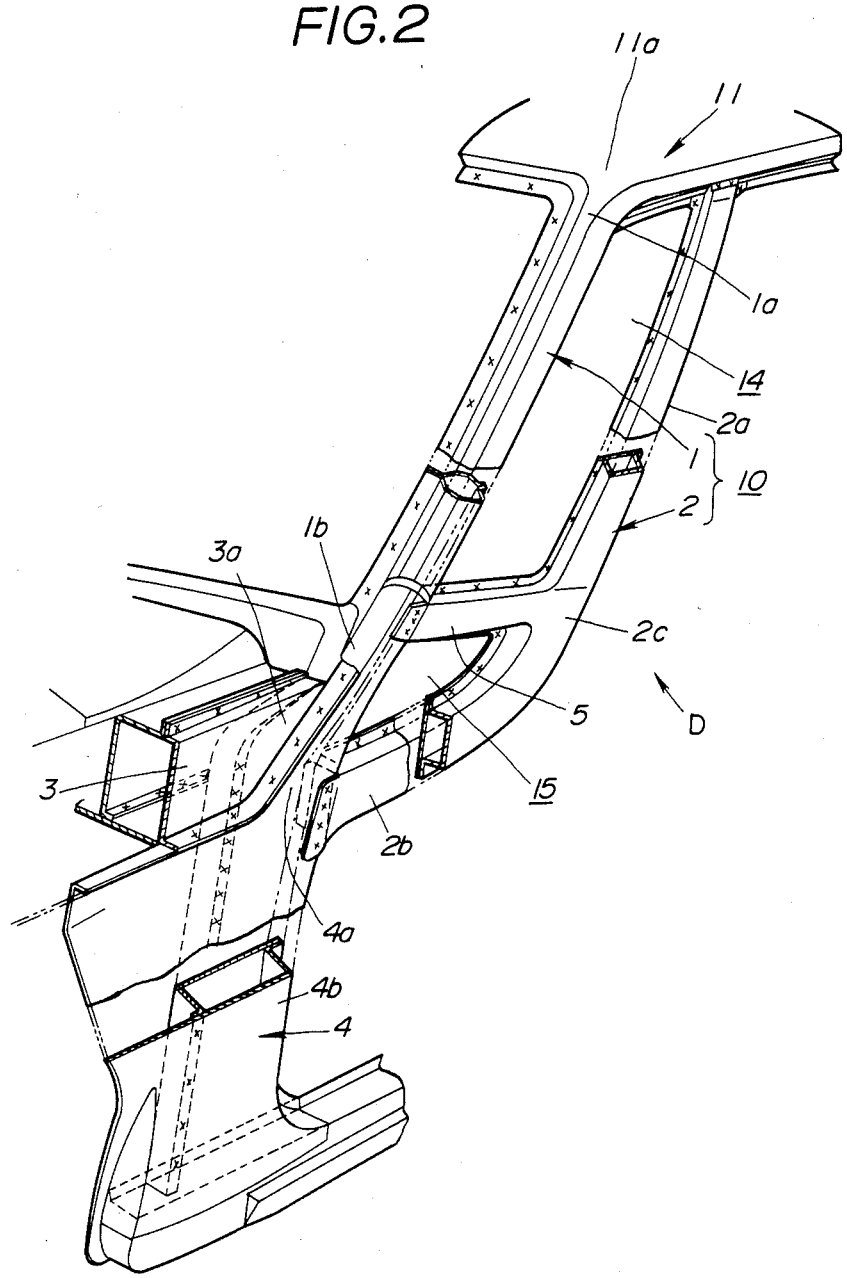
FIG. 2 is a perspective view with the essential portions enlarged and the exterior plate member excluded, illustrating the portion encircled by the dotted line and indicated by the arrow II in FIG. 1.

The following is a description on a specific construction of the front vehicle body structure composed of vehicle rigidity members consisting of the apron reinforcement 3, the hinge pillar 4 and the front pillar 10 etc with reference to FIG. 2.

The front pillar 10 includes a first front pillar 1 positioned on the front side of the vehicle body and a second front pillar 2 positioned on the side behind the first front pillar in the front-and-rear direction. The first front pillar 1 is of a nearly straight shape having a closed hollow section of an appropriate size, and the upper end 1a thereof is connected to the front end on the side of the roof panel 11 and the lower end 1b thereof is connected to the upper end portion 4a of the hinge pillar 4 having a closed hollow section and mounted in the verticle direction of the vehicle body.

The second front pillar 2 has a closed hollow section of an appropriate size, and its whole shape is such that the upper portion 2a is of a nearly straight shape and the lower portion 2b is of a shape curved largely toward the front side of the vehicle body. The second front pillar 2 is mounted in such a manner that the upper end thereof is connected to the front end portion 11a on the side portion of the roof panel 11 at an appropriate distance behind the welded position of the front pillar 1 in the rear position of the vehicle body, on the one hand, and the lower end thereof is connected to the upper portion 4a of the hinge pillar 4 in an appropriate distance below the connected position of the first front pillar 1, on the other hand. The second front pillar 2 is thus constructed so as to form a part of a door opening portion D in association with the lower portion 4b of the hinge pillar 4. A front door 20 for opening or closing the door opening portion D is hinged to the lower portion 4b of the hinge pillar 4.

Between the first front pillar 1 and the second pillar 2 is mounted a connecting member 5 extending in the front-and-rear direction of the vehicle body for reinforcement. In this embodiment, the connecting member 5 of a hollow section is formed integrally with the middle portion 2c of the second front pillar 2 and connected at its front end to the lower end portion 1b of the first front pillar 1. In an opening pillar 2, a window glass 21 is mounted in the upper opening 14 above the connecting member 5, and the lower opening 15 is mounted with a window glass 21 and the lower opening 15 below the connecting member 5 is designed so as to be covered with the front fender panel 13 as an exterior plate member. That is, at the upper portion on the rear end of the front fender panel 13 is mounted an extension 13b extending in the backward direction, and the extension 13b is designed so as to cover the lower portion 2b of the second front pillar 2 and the connecting member 5.

In the arrangement as described above, the first front pillar 1 and the second front pillar 2 constituting the front pillar 10 are disposed apart in the front-and-rear direction of the vehicle body and they are connected to each other at the respective upper lower end portions in a rigid manner so that a sectional performance of the front pillar 10 in the front-and-rear direction of the vehicle body becomes larger, for example, when the cross sectional area is kept constant, than where the front pillar 10 is composed of a single member, thus leading to an increase in a rigidity of the front pillar 10 and to an increase in a rigidity of the vehicle body itself. In other words, it is possible to widen the front field of vision because the respective front pillars 1 and 2 having each a relative small dimension of a cross section are disposed apart in the front and-rear direction of the vehicle body. Needless to say, although the respective front pillars 1 and 2 are rendered slimmer, they can compensate for each other, thereby leading particularly to an improvement in flexural rigidity and making the vehicle body light in weight by comparison with conventional structures of similar rigidity.

It is further to be noted that even if an excessive load would be put in the front-and-rear direction of the vehicle body in case of accidents such as a car crash, for example, such a crash load will be dispersed and transmitted from the hinge pillar 4 to the first front pillar 1 and the second front pillar 2 to thereby allow crash energies to be effectively absorbed because the front pillar 10 includes the first front pillar 1 and the second front pillar 2. This is an additional advantage achieved by the present invention that absorption of crash energies can be enhanced.

Although the above embodiment is directed to a connection of both the lower ends of the first front pillar 1 and the second front pillar 2 to the hinge pillar 4, it may be possible, for example, to connect the lower end of the second front pillar 2 to the apron reinforcement 3.

It also may be possible to integrate the lower end portion 2b of the second front pillar 2 with the connecting member 5 so as to fill up the lower opening 15 enclosed by the lower end portion 2b of the front pillar 2 and the connecting member 5.

It is to be understood that the foregoing text and drawings relate to embodiments given by way of example but not limitation. Various other embodiments and variation are intended to be encompassed within the spirit and scope of the invention.

What is claimed is:

1. A front vehicle body structure comprising:
a front pillar structure mounted as a vehicle body rigidity adding member between a front fender portion and a forward side end portion of the vehicle roof;
said front pillar structure comprising a first front pillar arranged on a forward side of the front pillar structure and a second front pillar arranged behind the first front pillar in the longitudinal direction of the vehicle body;
said first and second front pillars each having a hollow closed cross section, said first front pillar being of a nearly straight shape, an upper portion of said second front pillar being of a nearly straight shape and a lower portion thereof being of a largely forwardly curved shape;
said front fender portion having a rear end portion adapted to be mounted to a hinge pillar extending vertically, and said hinge pillar having a hollow closed cross section;
said first front pillar connected at its upper end to the forward side end portion of said roof and at its lower end to said hinge pillar so as to form an integral member having a common closed cross section; and
said second front pillar connected at its upper end to the forward side end portion of said roof at a position behind the position at which said first front pillar is connected to said forward side end portion of the roof and at its lower end to said hinge pillar.

2. The front vehicle body structure according to claim 1, wherein said second front pillar is connected at its lower end to a rearward surface of said hinge pillar.

3. A front vehicle body structure as claimed in claim 1, wherein:
   said first and second front pillars are connected together by a longitudially extending connecting member,
   said connecting member being connected at its front end to a lower end portion of said first front pillar and at its rear end to a middle portion of said second front pillar.

4. A front vehicle body structure as claimed in claim 2, wherein:
   said first and second front pillars are connected together by a longitudinally extending connecting member,
   said connecting member being connected at its front end to a lower end portion of said first front pillar and at its rear end to a middle portion of said second front pillar.

5. A front vehicle body structure as claimed in claim 3, wherein said connecting member is of a hollow closed cross section.

6. A front vehicle body structure as claimed in claim 4, wherein said connecting member is of a hollow closed cross section.

* * * * *